July 17, 1962 M. C. GOODWIN 3,044,724

RECORD SUPPLY MECHANISM

Filed Aug. 5, 1959

INVENTOR.
MACK C. GOODWIN

BY Gordon R. Sanborn
AGENT

United States Patent Office 3,044,724

Patented July 17, 1962

3,044,724

RECORD SUPPLY MECHANISM

Mack C. Goodwin, Detroit, Mich., assignor to Burroughs Corporation, Detroit, Mich., a corporation of Michigan Filed Aug. 5, 1959, Ser. No. 831,858
7 Claims. (Cl. 242—55)

The present invention relates to a mechanism for holding record material and more particularly to a supply mechanism for a roll of material adapted to permit rapid removal of the material from the mechanism.

In many applications wherein a thin strip of material such as a tape is utilized it is necessary to rapidly remove a strip of the material from a supply without having an excess of material spew from the supply. In machines such as tape perforators the tape is often stored on a rotatable storage reel with the rapid advancing of tape during a tape feed operation tending to rotate the supply reel with a high angular velocity. Due to the inertia of the reel and tape more tape is often removed from the reel than is required and hence it is advantageous to maintain a slight restoring force on the reel which is sufficient to prevent excess rotation of the reel and yet insufficient to cause breakage of the material. The problem of maintaining a restoring force on the supply reel is more pronounced when the supply reel is used with an apparatus in which the material is advanced a considerable distance during a short time interval since the supply mechanism attains a relatively high angular velocity. One such apparatus with which the mechanism of the present invention is adapted to be used is that disclosed in a copending application Serial No. 831,737, filed August 5, 1959, by Bogan, Brinning, and Goodwin titled "Combination Calculating and Punching Machine" which is assigned to the same assignee as is the present application.

It is an object of the present invention to provide an improved mechanism for storing a roll of material in a manner such that the material can be rapidly removed from the device. Another object of the present invention is to provide an improved record material supply reel which is operative to maintain a restoring force on the material as it is being removed from the reel to prevent the removal of an excess of the material due to the inertia of the reel and material thereon. A further object of the present invention is to provide an improved rotatable tape supply reel for supporting a roll of tape in a manner such that the tape during its removal from the reel is provided with a restoring force to prevent overfeeding of the tape from the reel.

Figure 1:
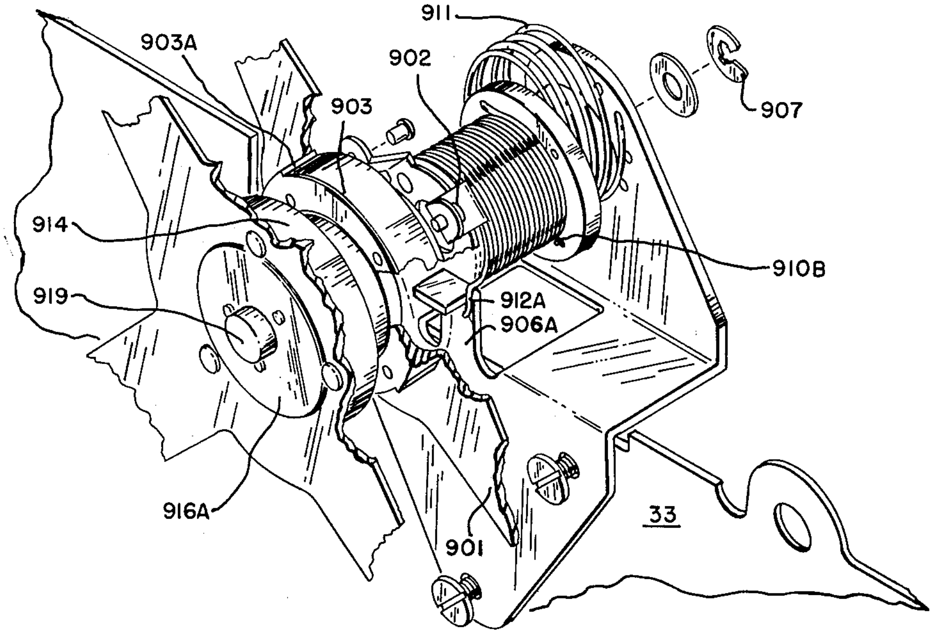
Figure 2:
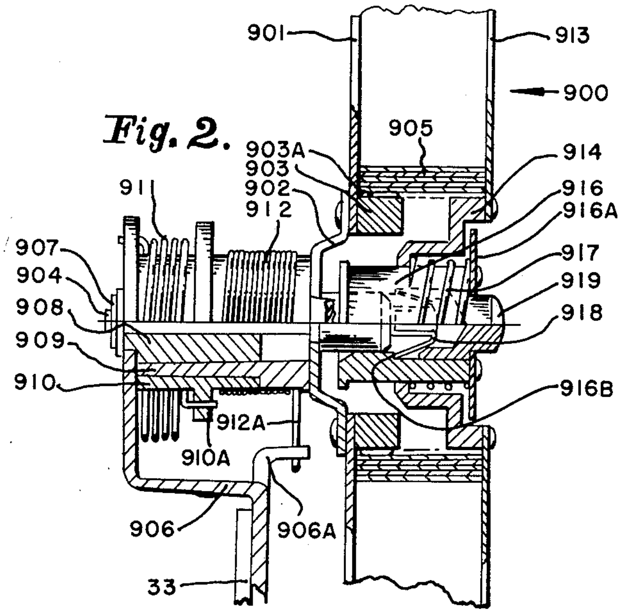

These and other objects of the present invention are set forth in the appended claims but the invention itself as well as additional advantages thereof will be more clearly understood from the following description when read with reference to the accompanying drawing wherein:

FIG. 1 is a perspective view of the supply mechanism as viewed from its right rear and illustrated as attached to the right side of a stationary portion of a machine and adapted to be rotated clockwise upon removal of material, and FIG. 2 is a front elevation of the parts shown in FIG. 1 with the lower half of the mechanism being cross-sectioned to more clearly show the manner of operation of the mechanism.

The mechanism includes first and second shafts which are supported for independent rotation with a section of each shaft being maintained in positions such that a member such as a spiral spring can encompass said sections to prevent relative rotation therebetween in a first direction and hence serve as a clutch member to transmit movement from one shaft to the other. One of the shafts is connected to means for supporting a roll of record material and hence upon removal of the material the one shaft is rotated in a first direction, which through the clutch member moves the other shaft in said first direction. A restoring spring is coupled with the second shaft to provide a restoring force in a direction opposite to said first direction and hence the material is provided with a restoring force tending to prevent the removal of material from the reel. The restoring force increases in accordance with the angular displacement of the first and second shafts and upon attaining a predetermined magnitude the clutch means is released to permit relative movement between the two shafts. The restoring force on the first shaft is thus increased until a selected magnitude is achieved and is then maintained constant as long as the material is being pulled from the reel. When the force applied to remove the material is reduced to a magnitude less than said predetermined magnitude the clutch member is again operative to couple the first and second shafts and hence apply the restoring force to the reel. Since the mechanism of the present invention is disclosed in the above referred to copending application the same reference numbers will be used in the present drawings as are used in said copending application.

As seen in FIGS. 1 and 2 the supply reel 900 is illustrated as supporting a roll of perforatable tape and includes an inner disk 901 which is supported by four arms 902 by means of a supporting ring 903 disposed on the right side of the disk 901 and secured to the arms 902 by means of rivets which pass through the disk 901 into the ring 903. The arms 902 are rigidly secured to the enlarged right end of a tape supply shaft 904 which passes through a small supporting plate 906 and is held in position thereon by means of a spring clip 907 which fits in an annular groove provided in the end of shaft 904. The supporting plate 906 could be attached to the side of any suitable machine and is illustrated as being screwed to the right side of the frame 33 of the calculating and punching machine described in the above referred to application. A main supporting bearing 908 is rigidly attached to the plate 906 and encompasses the shaft 904 to provide a bearing surface for the shaft 904. The arms 902 further carry a first hollow shaft or bushing shaft 909 which extends leftwardly and encompasses the bearing 908. It is thus seen that an arrangement is provided whereby the inner disk 901, shaft 904, and shaft 909 rotate as a single unit with the main bearing 908 being stationary on the plate 906 which is screwed to the frame 33. A second hollow shaft in the form of a sleeve 910 having a raised circumferential ridge 910A thereon is disposed about the shaft 909 and is rotatable with respect to the shaft 909. Since the first shaft 909 serves to support the second shaft 910 in the manner illustrated the first shaft will be referred to hereinafter as a bushing and the second shaft 910 as a sleeve disposed about said bushing. The diameter of the bushing 909 at its right end is equal to the outer diameter of the sleeve 910 and thus the sleeve 910 is held in place between the plate 906 and the raised right end of bushing 909. A first spring 911 having an inside diameter substantially larger than the outside diameter of the sleeve 910 encompasses said sleeve and has its left end secured to the plate 906 and its right end secured to the ridge 910A of the sleeve by means of the holes provided in the ridge 910A as seen in the rear perspective of FIG. 1. The spring 911 is so wound that if the sleeve 910 is rotated clockwise the spring 911 will be compressed or wound more tightly about said sleeve.

A second spring in the form of a spiral spring and which may be termed a clutch spring 912 encompasses the right end of the sleeve 910 and the right end of the bushing 909 with its left end secured to the ridge 910A on the sleeve. The inside diameter of clutch spring 912 when in an unstressed condition and removed from the bushing and sleeve is slightly less than the outside diameter of the right end of the sleeve and the right end of bushing 909. Thus when the clutch spring 912 is disposed about the sleeve and bushing as seen in FIG. 2 it is under tension and hence tends to grip the sleeve and the bushing. The clutch spring 912 is wound clockwise about the sleeve and bushing (starting at its inner or left end where it is secured to the ridge 910A) and thus clockwise rotation of the disk 901 and bushing 909 tends to wind the spring 912 more tightly about the bushing 909 and sleeve 910. Due to the grip of the spring on the bushing and the sleeve such clockwise rotation of the disk 901 as a result of the removal of tape from the reel 900 carries the sleeve 910 therewith and hence places the spring 911 under increased tension, said spring 911 tending to urge the sleeve 910 and disk 901 counterclockwise. The restoring force provided by the spring 911 increases as the angle of displacement of the disk 901 increases and if means were not provided to release the clutch spring 912 the spring 911 would continue to be wound more tightly about the sleeve 910 until a point would be reached at which no further rotation of the disk 901 would be permitted. To release the spring 912 an upwardly and rightwardly extending abutment lug 906A is provided in the path of a radially extending portion 912A of the right end of spring 912. When the end 912A of clutch spring 912 engages the lug 906A the further clockwise rotation of bushing 909 in attempting to rotate the spring expands the right-hand coils of the clutch spring and therefore the grip of the clutch spring on the bushing 909 is decreased and the bushing 909 can rotate while the spring 912 and the sleeve 910 remain stationary. The main spring 911 of course tends to rotate the sleeve 910 and the clutch spring 912 attached thereto counterclockwise but any such counterclockwise rotation would move the extension 912A on the clutch spring away from the lug 906A and hence permit a regripping of the clutch spring with the bushing 909. Any such regripping of bushing 909 by the spring 912 would cause the spring 912 and sleeve 910 to move clockwise due to the continued clockwise rotation of disk 901 and bushing 909. It is thus seen that the continued clockwise rotation of disk 901 which occurs as the tape is removed from the supply reel causes first a tensioning of spring 911 to a predetermined point and then a slippage of clutch spring 912 on the bushing 909. As long as the tape is fed from the supply reel or is provided with a force to hold the reel in its clockwise position the extension 912A on the clutch spring remains in engagement of the lug 906A and hence the restoring force provided by the spring 911 remains substantially constant. As soon as the clockwise urge of the disk 901 caused by the removal of tape is decreased, as for example by the completion of a tape feed operation, the spring 911 rotates the disk 901 counterclockwise back toward home position to a point where the force of spring 911 equals the force tending to remove the tape. In this way the tape can be provided with a restoring force which can be adjusted by adjusting the relative positions of the ends of the two springs 911 and 912. Such adjustment can be accomplished by placing the right end of spring 911 or the left end of spring 912 in a different one of the axial holes 910B provided in the ridge 910A on the sleeve. The restoring force could also be adjusted by having lug 906A movable to a number of fixed positions on the plate 906 so that the angle through which the clutch spring 912 must rotate prior to engagement of its extension 912A with the lug 906A could be adjusted.

The ring 903 which serves as part of the means for securing disk 901 to the arms 902 has a plurality of raised portions 903A which serve to grip the usual inner spool on which the tape is normally wound. Thus the spool of tape 905 is secured to the disk 901 with the lugs 903A preventing relative angular movement between the spool and the disk.

The present embodiment of the supply reel 900 is adapted to accommodate spools of tape of various widths by having an outer disk 913 positionable by varying distances to the right of the first disk 901. The disk 913 has an arbor 914 rigidly secured thereto which carries a cylinder 916 through the center thereof with said cylinder 916 having an enlarged end plate 916A screwed to its right end. The left end of cylinder 916 has a larger outer diameter than the inner diameter of the left end of the arbor 914 and hence the cylinder 916 is not removable from the arbor. The outer diameter of the right end of arbor 914 is the same as the outside diameter of ring 903 and thus serves to help support the spool of tape 905.

A small compression spring 917 is disposed about the cylinder 916 between the end plate 916A and the left end of the arbor 914 and hence when the cylinder 916 is connected to the right end of shaft 904 the spring 917 urges the outer disk 913 and arbor 914 leftwardly toward engagement with the right edge of the spool of tape. A small four-armed leaf spring 918 is screwed to the right end of the shaft 904 and has flared ends which are engageable with the inside of the cylinder 916 which has an axial opening of one diameter in its right-hand half and smaller diameter in its left-hand half to thereby provide a ridge 916B on the inner surface thereof. A small button 919 extends to the right through the end plate 916A and is provided with a shoulder portion which engages the plate 916A to prevent removal of the button from within the cylinder 916. The left end of the button 919 is in the form of a hollow shaft with a beveled surface at the left end which is engageable with the leaf spring 918. The spring 918 serves to hold the cylinder 916 on the shaft 904 through its engagement with the ridge 916B when the cylinder is pushed leftwardly over the end of the shaft 904. Spring 918 further serves through its engagement with the left end of the button 919 to maintain the button 919 in its FIG. 2 position. Upon pushing the button 919 leftwardly the left end thereof serves as a cam surface to release the spring 918 from the ridge 916B on the inside of cylinder 916 and hence permits removal of the cylinder 916 and outer disk 913 from the shaft 904. In this way the space between the inner and outer disks 901 and 913 is variable in accordance with the width of the tape used with the machine. That is, after the spool of tape is placed on ring 903 with disk 913 removed the cylinder 916 is pushed over the end of shaft 904 until the leaf spring 918 grips the ridge 916B. This compresses spring 917 between the arbor 914 and end plate 916A and hence urges the arbor 914 and disk 913 to the left into engagement with the right edge of the tape.

There has thus been described an improved tape supply mechanism operative to provide a variable restoring force having a selected maximum magnitude on the material as it is being removed from the mechanism. Although the mechanism has been illustrated as being used with a tape perforating machine it is obvious that its use is not limited to such applications but can be utilized in various applications in which it is necessary to rapidly remove a piece of record material from a supply of the material.

What is claimed is:

1. A storage mechanism for a roll of material comprising: first and second shafts supported for independent rotation; roll support means secured to said first shaft; means urging said second shaft to rotate toward a first position; and means engaged with each of said shafts permitting rotation of said first shaft with respect to said second shaft in a first direction only when said second shaft is in a predetermined second position.

2. A storage mechanism for a roll of material comprising: a first cylindrical member having support means thereon for said roll; a second cylindrical member disposed adjacent to said first member and supported for independent rotation; means urging said second member to rotate toward a first position with a force proportional to the displacement of said second member from said first position; a spiral spring disposed about said members and adapted to prevent rotation of said first member in a first direction with respect to said second member when said second member is in said first position; and means operative to expand said spring to allow rotation of said first member in said first direction with respect to said second member when said force reaches a predetermined magnitude.

3. A tape supply mechanism comprising in combination: a tape supply reel; a first shaft attached to said reel; a second shaft supported for independent rotation; spring means urging said second shaft to rotate toward a first position; clutch means engaging said first and said second shafts and normally preventing relative rotation therebetween; and means disengaging said clutch means to permit relative rotation between said shafts when said second shaft is displaced a predetermined distance from said first position.

4. A tape supply mechanism comprising: a first shaft having first and second sections; reel means connected to said shaft adapted to hold a roll of tape and prevent relative rotation between the roll and said shaft; a second shaft coaxially disposed about said first section and having an outside diameter substantially equal to that of said second section; a first spring urging said second shaft toward a first fixed position; a spiral spring disposed about said second shaft and said second section and having an unstressed inside diameter smaller than the outside diameter of said second shaft; and means engageable with said spiral spring operative when said second shaft rotates through a predetermined angle to expand said spiral spring.

5. A supply mechanism for the tape of a perforating machine comprising: a tape supply reel having means for storing a roll of tape therein; a bushing member connected to said reel; bearing means supporting said bushing member for rotation in response to removal of tape from said reel; a sleeve member encompassing a portion of said bushing member and rotatable with respect thereto; a first spring member yieldingly urging said sleeve member to a first position; a second spring member encompassing a portion of said sleeve member and a portion of said bushing member operative to normally prevent relative movement therebetween in response to removal of tape from said reel; and means engageable with said second spring member to permit relative movement between said bushing and sleeve members when said first spring member attains a predetermined tension.

6. A supply mechanism for a roll of perforatable tape comprising: first and second shafts supported for independent rotation, said first shaft having support means thereon for a roll of tape; means yieldingly urging said second shaft toward a first fixed position; a spiral spring disposed about said first and said second shafts operative in response to rotation of said first shaft in a first direction to grip said shafts and tend to prevent relative rotation therebetween; and means adapted to decrease the grip of said spring on one of said shafts in response to rotation of said shafts through a predetermined angle in said first direction.

7. A storage mechanism for a roll of perforatable material adapted for use with a perforating apparatus comprising in combination: first and second shafts supported for independent rotation about a common axis and each having a first section, said first shaft having support means thereon for said material; a first spiral spring disposed about said second shaft having a diameter greater than the outer diameter of said second shaft, said spring having one end connected to said second shaft and another end maintained in a fixed position; a second spiral spring disposed about said first sections operative to prevent rotation of said first shaft in a first direction with respect to said second shaft; and means engageable with one end of said second spring when said second shaft reaches a predetermined position to thereby expand said second spring in response to continued rotation of said first shaft in said first direction.

References Cited in the file of this patent

UNITED STATES PATENTS

| | | |
|---|---|---|
| 2,575,012 | Harvey | Nov. 13, 1951 |
| 2,626,029 | Gutterman | Jan. 20, 1953 |
| 2,705,599 | McCollough | Apr. 29, 1955 |
| 2,742,126 | Morton | Apr. 17, 1956 |